(12) United States Patent
Schmalz et al.

(10) Patent No.: US 6,168,220 B1
(45) Date of Patent: Jan. 2, 2001

(54) VACUUM MANIPULATION DEVICE

(75) Inventors: Kurt Schmalz; Wolfgang Schmalz, both of Dornstetten (DE)

(73) Assignee: J. Schmalz GmbH, Glatten (DE)

( * ) Notice: Under 35 U.S.C. 154(b), the term of this patent shall be extended for 0 days.

(21) Appl. No.: 09/289,967

(22) Filed: Apr. 13, 1999

(30) Foreign Application Priority Data

Apr. 21, 1998 (DE) .............................................. 198 17 777

(51) Int. Cl.$^7$ ...................................................... B66C 1/02
(52) U.S. Cl. .......................................... 294/64.1; 414/627
(58) Field of Search .................... 294/64.1–65; 414/627, 414/737, 752.1; 271/94, 96, 103

(56) References Cited

U.S. PATENT DOCUMENTS

| 2,274,304 | * | 2/1942 | Perry | 294/64.1 |
| 3,084,928 | * | 4/1963 | Opitz | 294/64.1 |
| 3,602,543 | * | 8/1971 | Sjodin | 294/64.1 |
| 4,561,687 | * | 12/1985 | Bostrom | 294/64.1 |
| 5,431,469 | * | 7/1995 | Ohno et al. | 414/627 |

FOREIGN PATENT DOCUMENTS

| 3325207A1 | 1/1985 | (DE) . | |
| 2511-921 | * 3/1983 | (FR) | 294/64.1 |
| 57-4840 | * 1/1982 | (JP) | 294/64.1 |
| 163735 | * 7/1964 | (SU) | 294/64.1 |
| WO 96/03602 | 2/1996 | (WO) . | |

* cited by examiner

Primary Examiner—Dean J. Kramer
(74) Attorney, Agent, or Firm—Jones, Tullar & Cooper, P.C.

(57) ABSTRACT

The present invention relates to a vacuum manipulation device having a lifter hose, which can be connected to a vacuum-generating device, and a suction gripper device, which can be placed on an object to be manipulated and with which the object can be drawn up by suction and lifted by contracting the lifter hose, the suction gripper device has a prestressed regulating member on its suction side, which is actuated by placing the suction gripper device on the object and which thereby unblocks a flow cross-section, so that the object can be drawn up by suction. To prevent the abrupt upward acceleration of the suction gripper device, the regulating member can be arrested in its actuated position, so that in case of the release of a drawn-up object from the suction side of the suction gripper device the flow cross-section is not again blocked, and in this way the abrupt upward acceleration of the suction gripper device is prevented.

13 Claims, 3 Drawing Sheets

VACUUM MANIPULATION DEVICE

FIELD OF THE INVENTION

The present invention relates to a vacuum manipulation device, having a lifter hose, which can be connected to a vacuum-generating device, and a suction gripper device, which can be placed on an object to be manipulated and with which the object can be drawn up by suction and lifted by contracting the lifter hose, wherein the suction gripper device has a prestressed regulating member on its suction side, which is actuated by placing the suction gripper device on the object and which thereby unblocks a flow cross-section, so that the object can be drawn up by suction.

BACKGROUND OF THE INVENTION

Such vacuum manipulation devices are known. When placing the suction gripper device, which can be controlled by means of a handle element, on an object to be lifted, the regulating member provided on the suction side is pushed inward, as a result of which a flow cross section between the suction side of the suction gripper device and the interior of the lifter hose is unblocked, so that the object can be drawn up by suction and lifted by the contraction of the lifter hose. If now the drawn-up object is inadvertently released from the suction side, the prestressed regulating member is pushed back into its initial position, as a result of which the flow cross-section is blocked. There is now the danger that because of the lack of a load the suction gripper device can abruptly be accelerate upward. But the danger of injury to the operators is connected with this.

SUMMARY OF THE INVENTION

Based on the foregoing, it is an object of the present invention to prevent the abrupt upward acceleration of the above described suction gripper device.

In a vacuum manipulation device of the type described at the outset, this object is attained in that the regulating member can be arrested in its actuated position, so that in case of the unintentional release of a drawn-up object from the suction side of the suction gripper device, the flow cross-section is not again blocked, and in this way the abrupt upward acceleration of the suction gripper device is prevented.

Thus, the regulating member is arrested in any arbitrary manner (mechanically, magnetically, electromagnetically) in its actuated position caused by the suction gripper device being placed on the object, so that it keeps the flow cross-section open, even when the object is released. In this case sufficient air can reach the interior of the lifter hose so that the above mentioned undesired effect does not occur.

The regulating member can be designed in a manner which per se is arbitrary. In an advantageous manner this is a plunger, which can be moved back and forth and which is preferably provided within a suction plate of the suction gripper device.

In a simple and therefore advantageous manner, the plunger is spring-loaded in the direction of its non-actuated initial position.

Fixing in place of the regulating member in its actuated position can be achieved in different ways, for example in a mechanical, magnetic or electromagnetic manner, by interlocking or by frictional connection. It has been shown to be particularly advantageous if the regulating member can be locked in place in its actuated position. In this case, in a preferred embodiment of the present invention the regulating member has a detent recess, in which blocking means can be locked when the plunger has been brought into its actuated position.

The blocking means can be a locking pin, which can be moved transversely to the displacement direction of the regulating member.

It has furthermore been shown to be advantageous if the regulating member can be released from its actuated position by means of an operating unit of the suction gripper device.

Further characteristics, details and advantages of the present invention ensue from the following claims and from the drawing representation of a preferred embodiment of the present invention.

DESCRIPTION OF THE PREFERRED EMBODIMENT

Figure 1:
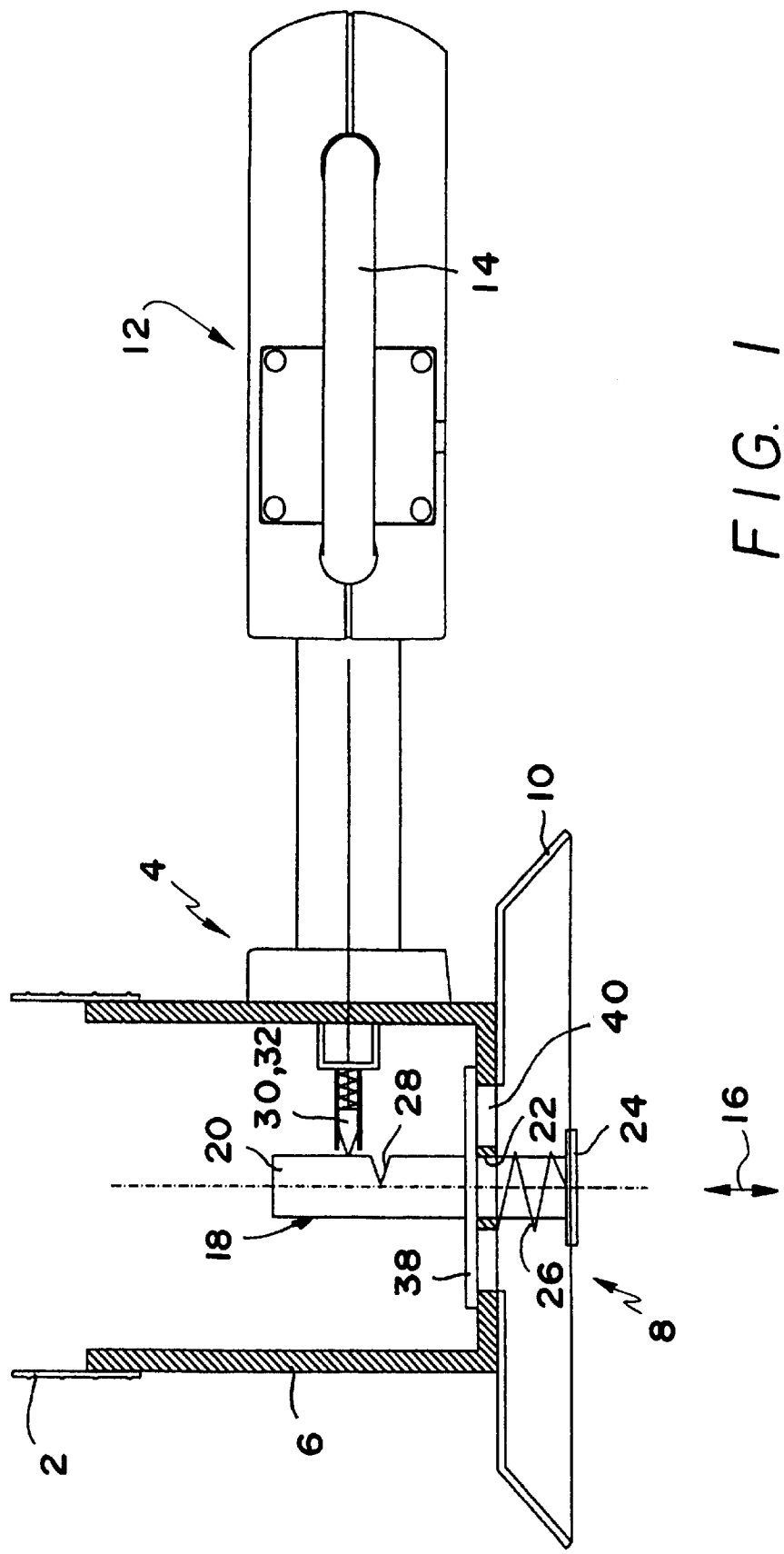
FIG. 1 represents a vacuum manipulation device in accordance with the present invention in the unoccupied state of the suction gripper device.

The drawing figures represent a vacuum manipulation device with a lifter hose 2, which is schematically illustrated and can be connected to a device for creating a vacuum, (not shown). A suction gripper device, identified as a whole by the reference numeral 4. The suction gripper device 4 comprises a cylindrical base body 6, which is connected with the lifter hose 2. A suction plate 10, which constitutes a suction side 8, is provided on the side of the base body 6 facing away from the lifter hose 2. Moreover, an operating unit 12 with handles 14 is also provided.

A regulating member 18 in the shape of a plunger 20, which can be moved back and forth in the set-down direction 16, is arranged inside the suction plate 10. The plunger is guided, slidingly displaceable, in a concentric guide section 22 of a bottom plate of the base body 6, and projects away from the interior of the base body 6 toward the suction side 8. On its free end, the plunger 20 has a plate 24, which comes to lie approximately on the level of the suction plate edge 10. A spring 26 is provided between the plate 24 and the guide section 22, which prestresses the plunger 20 in the direction toward an object to be drawn up, i.e. out of the suction gripper device 4.

A detent recess 28, in which a blocking means 30 in the form of a locking pin 32 can be locked, is provided in a section of the plunger 20 which comes to lie inside the suction gripper device 4. The locking pin 32 is displaceable transversely with respect to the set-down direction 16, or respectively the displacement direction of the plunger 20, and is itself spring-loaded in the direction toward the plunger 20. When the plunger 20 is displaced into the suction gripper device 4, the detent recess 28 moves past the locking pin 32, which in the process engages the detent recess 28 and fixes the plunger 20 in this position, regardless of whether or not an object to be manipulated has been drawn up on the suction side 8.

Figure 2:
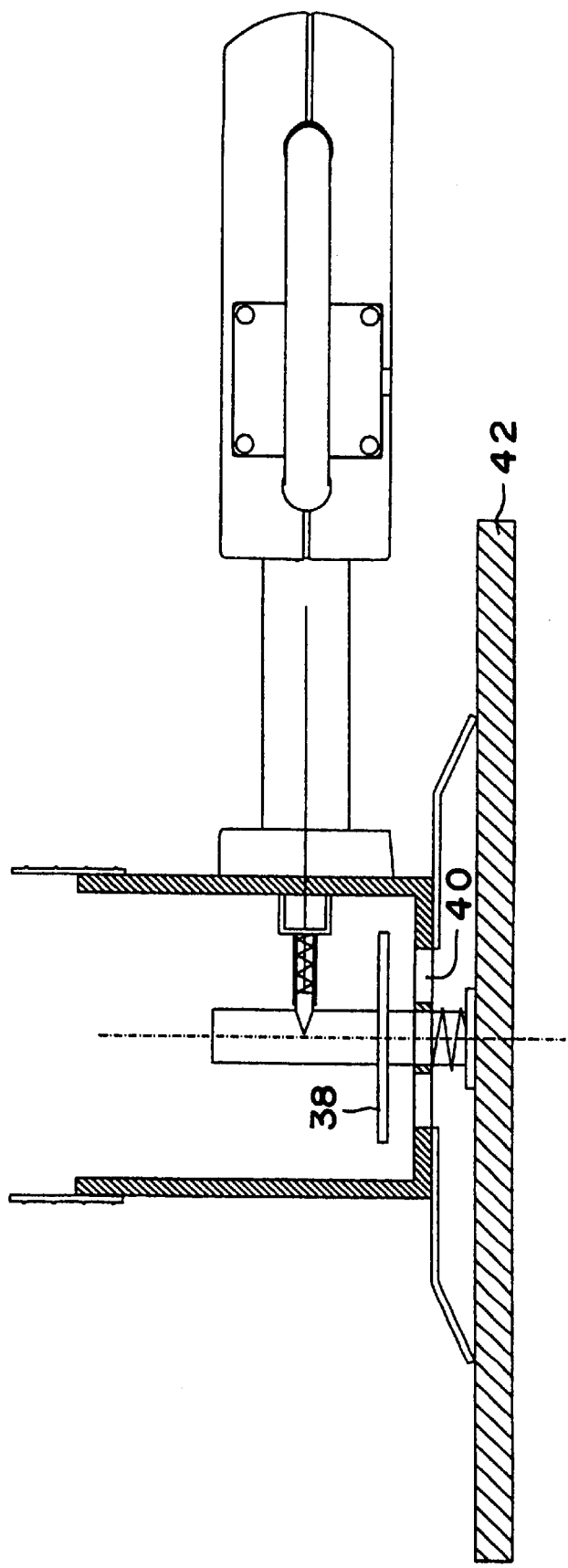
FIG. 2 represents the vacuum manipulation device of FIG. 1 with a drawn-up object.

The plunger 20 moreover has a valve plate 38 which, in the non-actuated state of the plunger 18, blocks a flow opening 40 in the bottom plate of the base body, i.e. on the suction side of the suction gripper device 4. When, as represented in FIG. 2, the suction gripper device 4 is placed on an object 42, the plunger 20 is pushed inward into its actuated position and the valve plate 38 unblocks the flow opening 40, so that the object 42 can be drawn up.

Figure 3:
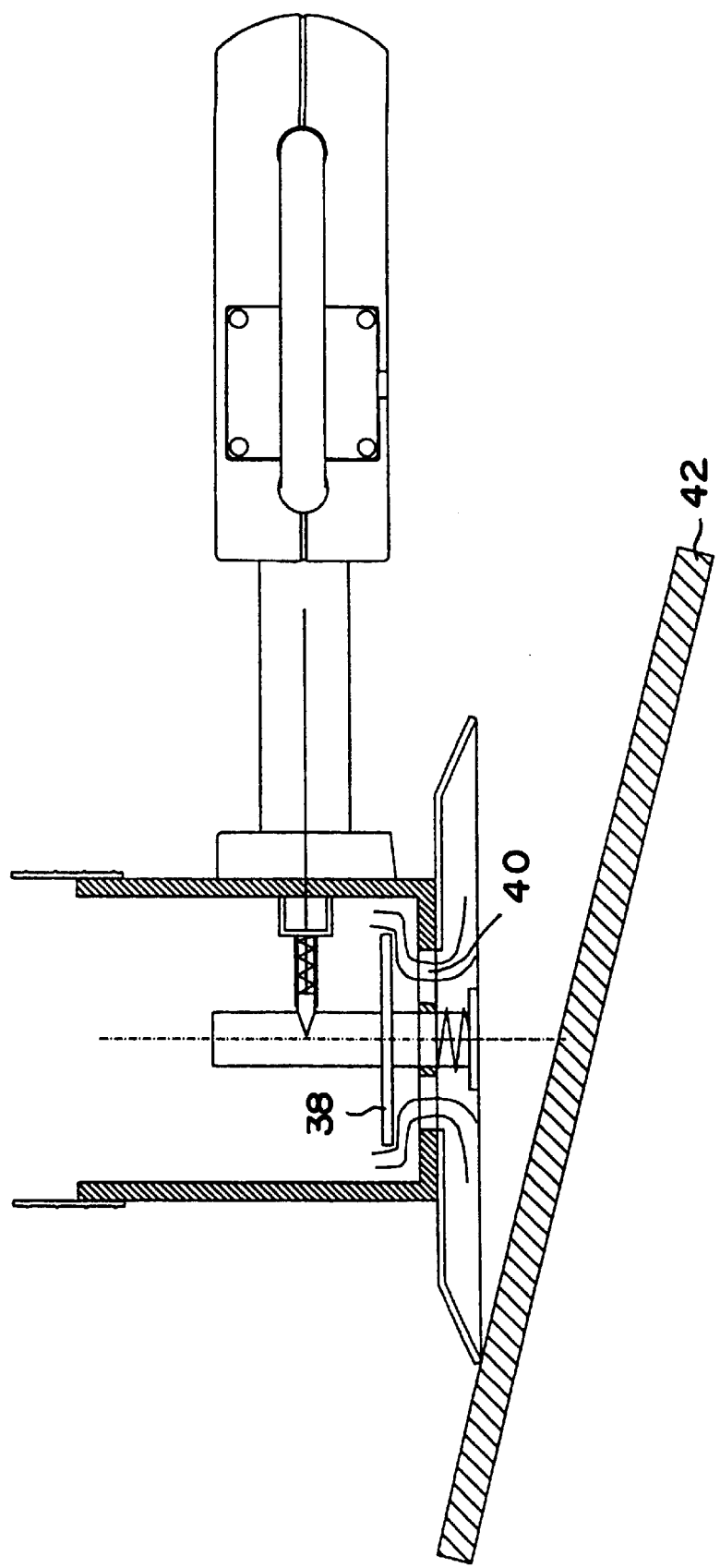
FIG. 3 represents the vacuum manipulation device of FIG. 2 with the object released.

If the object 42 is unintentionally released, as represented in FIG. 3, the plunger 20, which is arrested in its actuated position by means of the locking pin 32, is prevented from being moved back into its initial position, so that the flow opening 40 and its flow cross-section remain open and air can flow into the suction gripper device 4 and the lifter hose 2. By means of this the suction gripper device 4 is prevented from being abruptly accelerated upward.

The locking pin 32 can be retracted from the operating unit 12, so that the plunger can be moved back into its initial position by the action of the spring 26 and in the process again blocks the flow cross-section.

What is claimed is:

1. A vacuum manipulating device for an object to be manipulated by being drawn up by suction, comprising:
   a lifter hose connected to a vacuum-generating device; and
   a suction gripper device which engages the object to be manipulated and draws up the object by suction and lifts it by contracting said lifter hose, said suction gripper device includes a prestressed regulating member on its suction side, which when in engagement with the object, unblocks a flow cross-section so that the object is drawn up by suction,
   wherein said regulating member is arrested in its actuated position so that in the event of an unintentional release of the drawn-up object, said flow cross-section is not blocked thereby preventing the abrupt upward acceleration of the suction gripper device.

2. The vacuum manipulating device as defined in claim 1, wherein said regulating member is a plunger, movable back and forth in a set-down direction.

3. The vacuum manipulating device as defined in claim 2, wherein said suction gripper device further includes a suction plate, and wherein said plunger is provided to extend inside of said suction plate.

4. The vacuum manipulating device as defined in claim 2, wherein said plunger is spring-loaded to provide said prestress.

5. The vacuum manipulating device as defined in claim 1, wherein said suction gripper device further includes a suction plate which defines a front plane, and wherein said regulating member includes a front face which, in the non-actuated position of said regulating member is situated in said front plane by said prestress.

6. The vacuum manipulating device as defined in claim 1, wherein said regulating member can be locked in an actuated position, when said regulating member is moved against said prestress.

7. The vacuum manipulating device as defined in claim 6, wherein said regulating member includes a detent recess, and wherein said suction gripper device farther includes blocking means which engages said detent recess for locking said regulating member when said regulating member is in its actuated position.

8. The vacuum manipulating device as defined in claim 7, wherein said blocking means includes a locking pin which moves transversely with respect to the displacement direction of said regulating member.

9. The vacuum manipulating device as defined in claim 7, wherein said blocking means are spring-loaded.

10. The vacuum manipulating device as defined in claim 1, wherein said suction gripper device further includes an operating unit for releasing said regulating member out of its actuated position.

11. The vacuum manipulating device as defined in claim 6, wherein said regulating member includes a detent recess, and wherein said operating unit engages said detent recess and said regulating member can be released by retraction of said operating unit from said detent recess.

12. The vacuum manipulating device as defined in claim 1, wherein said regulating member includes a valve plate, by means of which the flow cross-section is blocked when said suction gripper device is uncoupled, and is unblocked in the actuated position of said regulating member.

13. A vacuum manipulating device for an object to be manipulated by being drawn up by suction, comprising:
   a lifter hose connected to a vacuum-generating device; and
   a suction gripper device which engages the object to be manipulated and draws up the object by suction and lifts it by contracting said lifter hose, said suction gripper device includes a prestressed regulating member on its suction side, which when in engagement with the object, unblocks a flow cross-section so that the object is drawn up by suction, a suction plate which defines a front plane,
   wherein said regulating member includes a front face which, in the non-actuated position of said regulating member is situated in said front plane by said prestress, and a valve plate, by means of which the flow cross-section is blocked when said suction gripper device is uncoupled, and is unblocked in the actuated position of said regulating member, said regulating member being arrested in its actuated position so that in the event of an unintentional release of the drawn-up object, said flow cross-section is not blocked thereby preventing the abrupt upward acceleration of the suction gripper device.

* * * * *